United States Patent
Smith et al.

(10) Patent No.: US 12,479,344 B2
(45) Date of Patent: Nov. 25, 2025

(54) ARM REST TRASH COMPARTMENT

(71) Applicant: Lear Corporation, Southfield, MI (US)

(72) Inventors: Lea Thomas Smith, Severna Park, MD (US); Thomas Sundberg, Southfield, MI (US); Jochen Kohlhofer, Altfraunhofen (DE)

(73) Assignee: Lear Corporation, Southfield, MI (US)

( * ) Notice: Subject to any disclaimer, the term of this patent is extended or adjusted under 35 U.S.C. 154(b) by 92 days.

(21) Appl. No.: 18/132,084

(22) Filed: Apr. 7, 2023

(65) Prior Publication Data

US 2023/0415625 A1  Dec. 28, 2023

(30) Foreign Application Priority Data

Jun. 27, 2022 (DE) ...................... 10 2022 115 956.6

(51) Int. Cl.
*B60N 2/75* (2018.01)
*B60N 3/08* (2006.01)
(Continued)

(52) U.S. Cl.
CPC ............ *B60N 2/757* (2018.02); *B60N 2/793* (2018.02); *B60N 3/08* (2013.01); *B60N 3/102* (2013.01); *B60R 7/043* (2013.01)

(58) Field of Classification Search
CPC .......... B60N 2/757; B60N 2/793; B60N 3/08; B60N 3/102; B60R 7/043
See application file for complete search history.

(56) References Cited

U.S. PATENT DOCUMENTS 4,928,865 A  *  5/1990  Lorence .................. B60N 3/102
                                              224/279
5,096,152 A  *  3/1992  Christiansen .......... B60N 3/102
                                              248/278.1
(Continued)

FOREIGN PATENT DOCUMENTS

DE         29619477 U1  *  3/1997  ........... B60N 2/4686
DE   10 2013 204 000 A1     9/2014
(Continued)

OTHER PUBLICATIONS

Fehrer, G; DE-29619477-U1; Mar. 20, 1997; machine translation (Year: 1997).*

(Continued)

*Primary Examiner* — David R Dunn
*Assistant Examiner* — Tania Abraham
(74) *Attorney, Agent, or Firm* — Brooks Kushman P.C.

(57) ABSTRACT

The present application relates to an arm rest trash compartment. An arm rest assembly includes an arm rest body having an A-surface with a trash cavity defined therethrough; and a trash compartment corresponding to the trash cavity. The trash compartment includes a movable member releasably secured at the A-surface, and a flexible member which forms the trash cavity. The trash compartment has a stored position and an extended position, where, in the stored position, the movable member is flush with the A-surface, and in the extended position, at least a portion of the flexible member is positioned below the A-surface such that a trash cavity volume in the extended position is greater than a trash cavity volume in the stored position.

20 Claims, 7 Drawing Sheets

(51) Int. Cl.
    *B60N 3/10* (2006.01)
    *B60R 7/04* (2006.01)

(56) References Cited

U.S. PATENT DOCUMENTS

| | | |
|---|---|---|
| 7,004,546 B1 | 2/2006 | Thisius et al. |
| 8,985,820 B2 | 3/2015 | Mazur et al. |
| 9,199,562 B2 * | 12/2015 | Skapof .................. B60N 2/793 |
| 10,611,299 B1 | 4/2020 | Colletti |
| 10,709,249 B2 * | 7/2020 | Liu ........................ A47C 7/541 |
| 10,850,849 B2 * | 12/2020 | Green ...................... B60N 2/79 |
| 10,899,263 B2 | 1/2021 | Schnur et al. |
| 11,027,638 B2 | 6/2021 | Alexandersson |
| 2013/0126691 A1 * | 5/2013 | Miklas .................. B60N 3/102 |
| | | 248/311.2 |
| 2016/0243969 A1 * | 8/2016 | Dunham ................ B60N 3/102 |
| 2018/0281653 A1 * | 10/2018 | Guilhem ................. B60N 3/08 |
| 2019/0366901 A1 * | 12/2019 | Stoner ..................... B65F 1/125 |

FOREIGN PATENT DOCUMENTS

| | | | | |
|---|---|---|---|---|
| GB | 1 541 885 A | | 3/1979 | |
| GB | 2413270 A | * | 10/2005 | ............. B60N 2/757 |
| WO | 99/039935 A1 | | 8/1999 | |

OTHER PUBLICATIONS

DE Office Action for DE Application No. 10 2022 115 956.6 dated Jun. 12, 2023, and Machine Translation, 4 pages.

\* cited by examiner

ARM REST TRASH COMPARTMENT

CROSS-REFERENCE TO RELATED APPLICATION

This application claims foreign priority benefits under 35 U.S.C. § 119(a)-(d) to DE patent application 10 2022 115 956.6, filed Jun. 27, 2022, the disclosure of which is hereby incorporated by reference in its entirety.

TECHNICAL FIELD

The present application is directed to an arm rest assembly, and more particularly an arm rest assembly with a trash compartment.

BACKGROUND

Conventional seats include seat bottoms and seat backs, with each including a foam cushion with a respective trim cover disposed over the foam cushion. Conventional seats may also include arm rest assemblies cooperating with the seatbacks. The arm rest assembly may be a fixed console or be configured to be stored in a seat back assembly. Conventional arm rest assemblies include various features for occupant convenience, such as compartments, cup holders, and the like.

SUMMARY

According to one or more embodiments, an arm rest assembly includes an arm rest body having an A-surface with a trash cavity defined therethrough, and a trash compartment corresponding to the trash cavity. The trash compartment includes a movable member releasably secured at the A-surface, and a flexible member which forms the trash cavity. The trash compartment has a stored position and an extended position, where, in the stored position, the movable member is flush with the A-surface, and in the extended position, at least a portion of the flexible member is positioned below the A-surface such that a trash cavity volume in the extended position is greater than a trash cavity volume in the stored position. The arm rest assembly may include other features that cooperate with the trash compartment or features of the trash compartment, such as cupholders and storage compartments.

DETAILED DESCRIPTION

As required, detailed embodiments of the present invention are disclosed herein; however, it is to be understood that the disclosed embodiments are merely exemplary of the invention that may be embodied in various and alternative forms. The figures are not necessarily to scale; some features may be exaggerated or minimized to show details of particular components. Therefore, specific structural and functional details disclosed herein are not to be interpreted as limiting, but merely as a representative basis for teaching one skilled in the art to variously employ the present invention.

Moreover, except where otherwise expressly indicated, all numerical quantities in this description and in the claims are to be understood as modified by the word "about" in describing the broader scope of this invention. The term "substantially," "generally," or "about" may be used herein and may modify a value or relative characteristic disclosed or claimed. In such instances, "substantially," "generally," or "about" may signify that the value or relative characteristic it modifies is within ±0%, 0.1%, 0.5%, 1%, 2%, 3%, 4%, 5% or 10% of the value or relative characteristic. Practice within the numerical limits stated is generally preferred. Also, unless expressly stated to the contrary, the description of a group or class of materials by suitable or preferred for a given purpose in connection with the invention implies that mixtures of any two or more members of the group or class may be equally suitable or preferred.

According to embodiments of the present disclosure, an arm rest assembly with a trash compartment is provided. The trash compartment may be concealed and revealed by a cupholder panel, a storage compartment door, storage in the arm rest body, or combinations thereof. The trash compartment includes a frame and a movable member that allows for the volume of the trash cavity to be increased when the movable member is in an extended position from the frame. The trash compartment also includes a flexible member (e.g., a trash bag already secured with the frame that moves with the movable member to the extended position, or a disposable bag releasably securable on the frame). The movable member can be biased to the extended position and released by engaging a button to release the movable member, or may be pushed manually to the extended position upon accessing the trash compartment (e.g., for a disposable bag or a scissor-wire mechanism in the flexible member).

Figure 1:
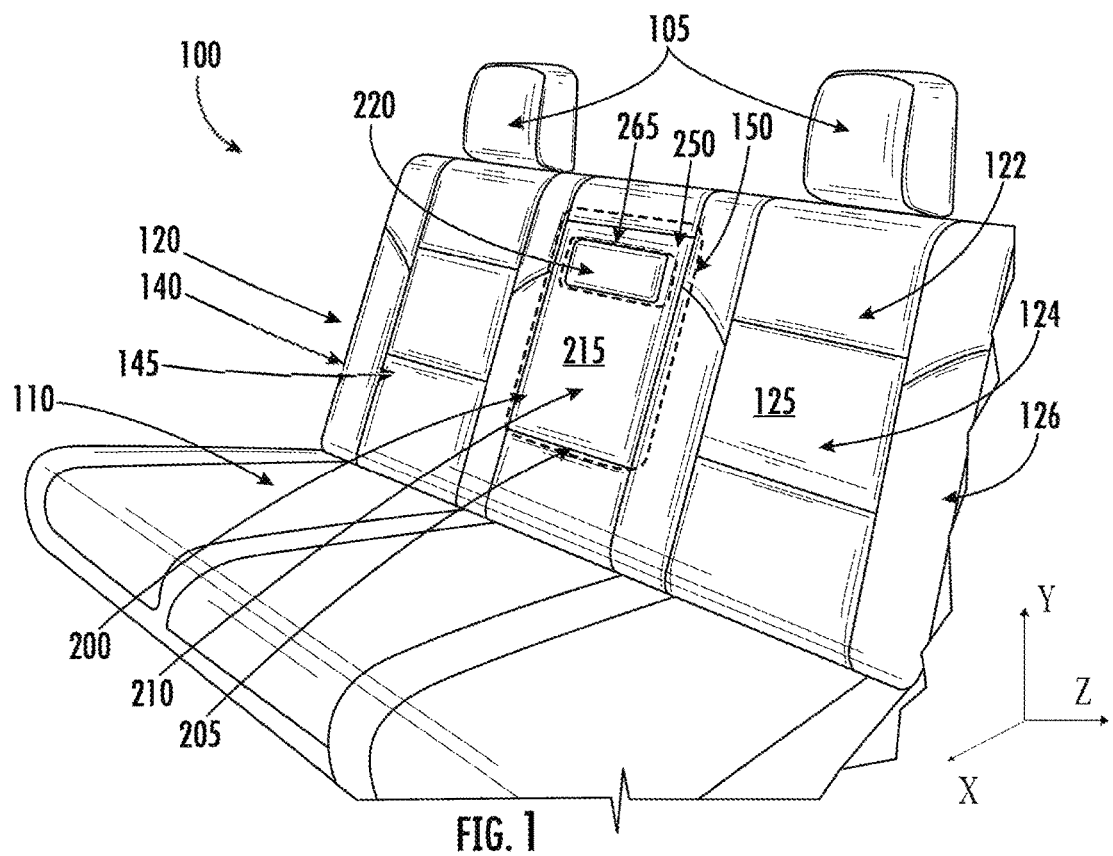
FIG. 1 is a perspective view of a representative vehicle seat assembly, according to an embodiment.

Referring to FIG. 1, an embodiment of a seat assembly 100 is shown. While the vehicle seat assembly 100 is illustrated in FIG. 1 to be a bench seat assembly, it should be understood that the principles of the present disclosure are applicable to other types of seat assemblies that include seats and an arm rest that pivots between a stowed position, where the arm rest is positioned in an arm rest storage cavity 150 defined in the seatback A-surface, and a deployed position for use. Still further, it should also be understood that the principles of this disclosure are applicable to all types of vehicle seat assemblies as well as non-vehicle seat assemblies, and discussion of a vehicle seat is not intended to be limiting. The seat assembly 100 can be configured for use in a vehicle, such as motor vehicle like a car or truck, or for use in non-vehicular applications.

The seat assembly 100 includes a seat bottom 110 and a seatback 120 pivotally disposed on the seat bottom 110. The seat bottom 110 is mountable to a surface such as a vehicle floor. For example, the seat bottom 110 may be mounted on a seat frame (not shown) which can be removably secured to the vehicle floor. The seat assembly 100 is shown as a bench in FIG. 1, comprising individual seats, each having individual seat bottoms and seatbacks that collectively form the seat assembly 100. As such, reference to a seat bottom 110 and seatback 120 may refer to the seats collectively (i.e., the bench), or individually. The individual seatbacks 120 may be movable relative to other seatbacks of the seat assembly 100. For example, the seat assembly 100 may have a split seatback construction, a 40/20/40 seatback construction, an evenly spaced seatback 3-seat construction, or other suitable construction of splitting the bench into individual seats as based on the desired aesthetic and function of the bench. In some embodiments, the seatback 120 may include a corresponding head restraint 105. Although FIG. 1 shows a vehicle seat assembly includes the head restraint 105, however, seat assembly designs may be constructed without the head restraint 105, or the head restraint 105 may be removable attached or pivotably attached based on design considerations of the vehicle interior, and each head restraint 105 may be constructed differently as based on the position on the seat assembly 100. Generally, the head restraint 105 is located at an upper end of the seatback 120, as defined along the axis Y over the height of the seatback 120, as shown in FIG. 1.

The seat bottom 110 and seatback 120 each include a foam cushion (not shown) having a trim cover assembly 140 disposed thereon. The foam cushions can be conventionally secured to a seat frame by any method generally known in the art. Each foam cushion may be one or more foam parts, joined together to form the seating component. For example, the seatback 120 foam cushion may include side bolster portions, or any other components to meet a selected design. The trim cover assembly 140 is disposed on the foam cushion, and secured to the foam cushion via any suitable attachment mechanism. The foam cushions can have any suitable size and configuration, based on the selected design for the vehicle seating arrangement, and particular the rear seats. The foam material of the cushions may be any suitable comfort foam material that provides soft resilience during use, such as, but not limited to, a suitable resilient polymer (e.g., polyurethane foam, soy-based foam, silicone, thermoplastic olefins, thermoplastic urethanes, polymer fibers, non-woven polyester pads, natural oil-based expanded polyurethanes, latex foams, and the like) and may be formed in any suitable manner.

The trim cover assembly 140 forms an exterior seating surface, also known as the A-surface 125, which can be an occupant support surface for the seat assembly 100. The trim cover assembly 140 includes a trim cover 145 that is made of at least one suitable material, such as, but not limited to, leather, synthetic leather, vinyl, fabric, synthetic suede, non-woven fabric, or combinations thereof (fabric-to-fabric, leather-to-leather, fabric-to-leather, leather-to-fabric, etc.). It should be understood that different portions of the seatback 120 and the seat bottom 110 may have a different trim cover portions forming the trim cover assembly 140 as based on the desired aesthetics for the seat assembly 100. Moreover, the trim cover assembly 140 can differ from the seat bottom 110 to the seatback 120, in addition to varying between the side bolsters and the upper regions. In at least one embodiment, as shown in FIG. 1, the trim cover assembly 140 comprises a plurality of trim cover panels that are secured together that form different regions of the seatback 120. For example, a top panel portion 122 and a central panel portion 124 are stitched, or otherwise secured, together, to the peripheral trim panels 126 (i.e., side bolsters) via stitching or seams. The trim cover assembly 140 on the inner side (i.e., B-surface, opposite to the A-surface), can have other conventional layers such as a thin foam layer (not shown) and various trim to secure the trim cover assembly 140 to the frame and/or foam cushions.

As shown in FIG. 1, the seat assembly 100 includes an arm rest assembly 200 pivotally disposed with respect to the seatback 120. The arm rest assembly 200 includes a cushion with a trim cover as part of the trim cover assembly 140 disposed thereon. As will be described hereinafter, the arm rest assembly 200 may be a center console including various features for occupant convenience, such as cup holders or compartments or other features typically included in the arm rests. Although shown as a center arm rest assembly, the arm rest assembly 200 may be any suitable arm rest, and depiction of the arm rest assembly 200 in the center of the seat 100 is not intended to be limiting.

In the embodiment shown in FIG. 1, the arm rest assembly 200 is pivotally attached relative to the seatback 120 such that it can be stored upright in a corresponding arm rest storage cavity 150 in the seatback 120, and deployed to a use position by pivoting about a pivot axis 205. The arm rest assembly 200 may pivot relative to the pivot axis 205, such that when pivoted forward (e.g., away from the front surface (A-surface 125) of the seatback 120, as defined along the axis X shown in FIG. 1) the arm rest assembly 200 is positioned above the seat bottom 110 and extending away from the seatback 120 in the deployed position. Although shown as a pivoting arm rest assembly 200, the depiction of a pivoting arm rest assembly 200 is not intended to be limiting, and the features described in the present embodiments are similarly applicable to fixed arm rest assemblies and consoles. The arm rest assembly 200 is secured to the seat back 120 in any suitable manner, including, but not limited to, mounting plates, a mounting frame, or similar attachment structure.

With reference to FIGS. 2-13, various embodiments of the arm rest assembly 200 are shown.

Referring again to FIG. 1, as like numerals will be used throughout the Figures for the same components across various embodiments, the arm rest assembly 200 includes an arm rest body 210 secured to the seat back 120. In the embodiment shown in FIG. 1, the arm rest body 210 is sized to be stored in the seatback 120 in the storage cavity 150 in the stored position such that an A-surface 215 of the arm rest body 210 (when in the stored position) is generally consistent with the A-surface of the seat back 120. To reach the use position (as shown in FIGS. 2-13), the arm rest body 210 is deployed from the storage cavity 150 and pivoted about the pivot axis 205. Although shown as a pivoting arm rest assembly 200, the arm rest assembly 200 may also be fixed in the use position, in other embodiments not illustrated, and similarly include the features described herein. In at least one embodiment, as shown in FIG. 1, the arm rest assembly 200 includes a movable member 220 corresponding to a trash compartment, with the movable member 220 generally flush with the A-surface 215 of the arm rest body 210 when in the stored position. Details regarding the movable member 220 will be discussed in further detail with reference to FIGS. 2-13. Although the movable member 220 is shown as a rectangular shape and positioned at a certain vertical height along the Y-axis (at distal end 250 of the arm rest body 210), this is not intended to be limiting, and the movable member 220 may have any suitable shape, dimension, and location as based on the shape, dimension, and location of the trash compartment, as will be described in further detail below. For example, in another embodiment, the movable member 220 may have a different shape as based on the trash compartment of FIGS. 11-13.

Figure 2:
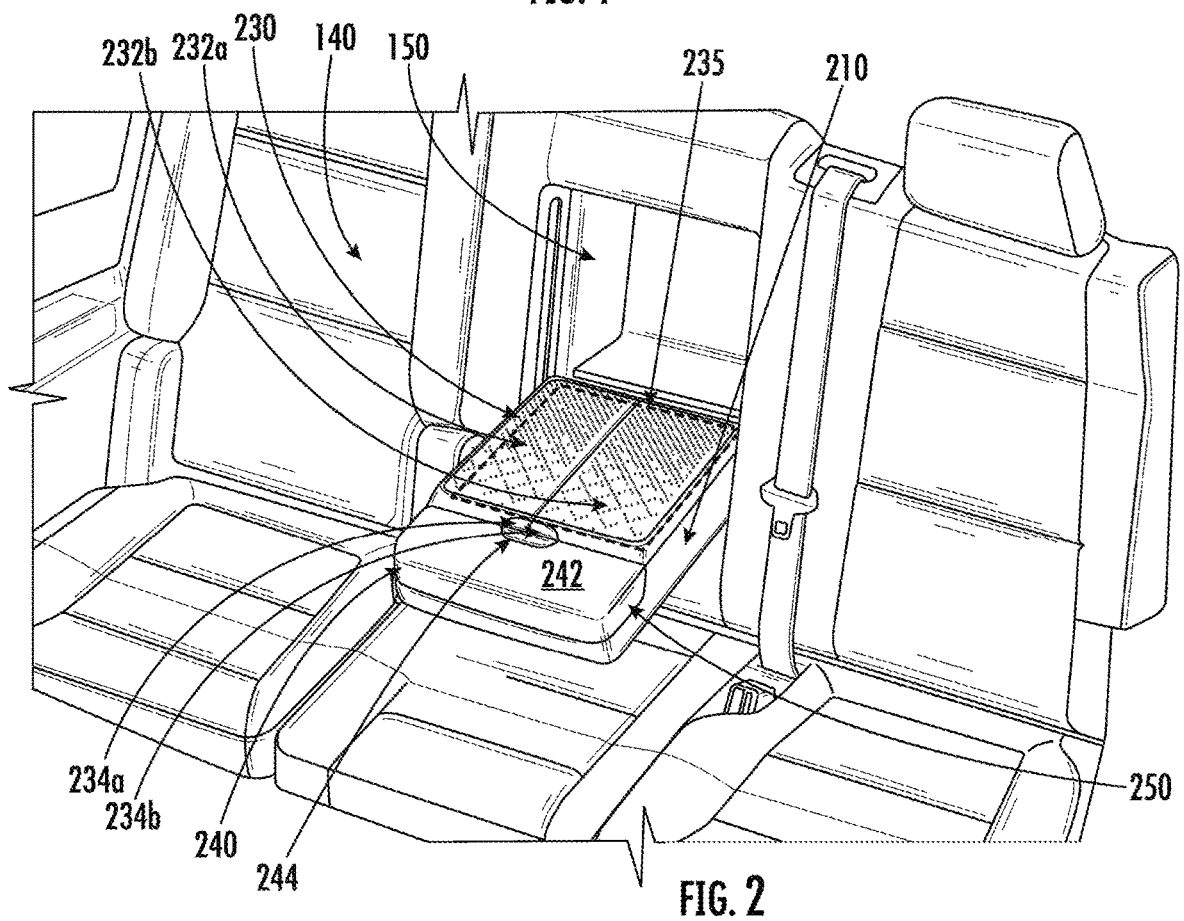
FIG. 2 is a perspective view of an arm rest assembly, according to an embodiment.

Referring to FIG. 2, the arm rest assembly 200 is shown, according to an embodiment. In FIG. 2, the arm rest body 210 is shown in the use position, with the arm rest body 210 pivoted forward in the X-direction, such that the A-surface 215 is facing and positioned above the seat bottom 110. The arm rest body 210 is pivoted forward via mounting plates, a mounting frame, or similar attachment structure (not shown). The trim cover assembly 140 includes a trim close out 142 for the storage cavity 150, which may be any suitable material for closing out the storage cavity 150 for the arm rest body 210. As such, the trim close out 142 may be the same material as the trim cover 145, or be a different suitable material for closing out the storage cavity 150.

Figure 3:
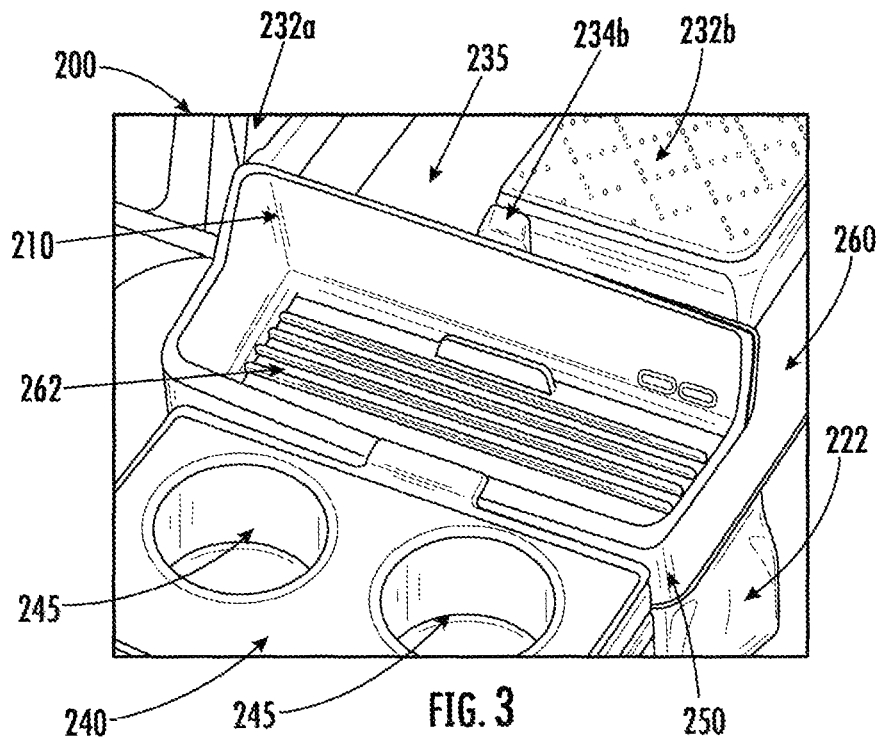
FIGS. 3-4 are schematic illustrations of features of the arm rest assembly of FIG. 2, with a cover in a closed position and an open position, respectively.
Figure 4:
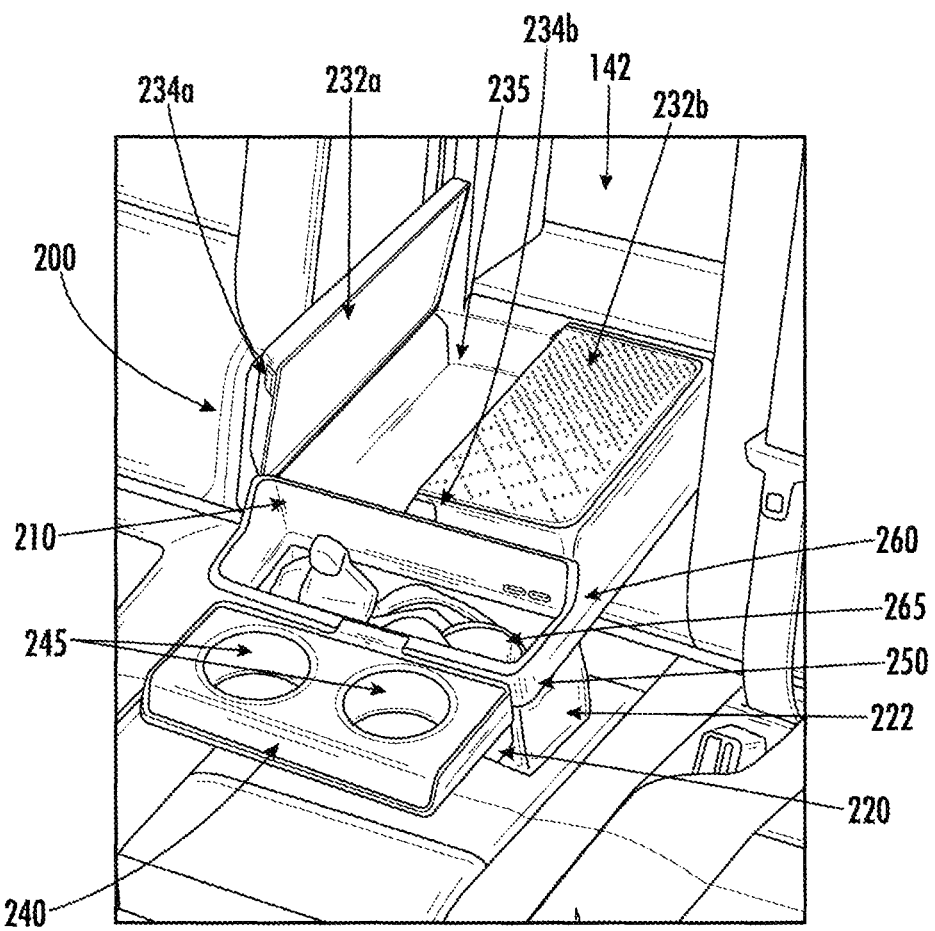

The arm rest assembly 200 includes a storage compartment 230, with a storage compartment cavity 235 defined in the arm rest body 210, with storage compartment doors 232a, 232b concealing the storage compartment cavity 235. In the embodiment of FIG. 2, the storage compartment 230 is shown closed with the storage compartment doors 232a, 232b concealing the storage compartment cavity 235. The storage compartment doors 232a, 232b may include any suitable features for opening the storage compartment doors 232a, 232b. For example, as shown in the embodiment of FIG. 2, the storage compartment doors 232a, 232b may be biased in an open position (for revealing the storage compartment cavity 235), and released via pushing on buttons 234a, 234b, respectively. Although shown as two buttons 234a, 234b, the storage compartment doors 232a, 232b may be simultaneously released by a single button. In other embodiments, not shown, the storage compartment doors 232a, 232b may be opened and closed in any suitable manner, and may not be biased to being open. Furthermore, although shown with two doors opening in the middle between the doors and hinged at outer points on the arm rest body 210 such that the doors open in the Z-direction of the vehicle, the compartment may be concealed in any suitable manner, and depiction of French-door style concealment is not intended to be limiting. In FIGS. 3-4, the storage compartment 230 is shown with one storage compartment door 232a in the open position, revealing a portion of the storage compartment cavity 235.

Referring again to FIG. 2, the distal end 250 of the arm rest body 210 includes a cupholder panel 240 on the inner side of the arm rest body 210, opposite to the A-surface 215. The cupholder panel 240 has a stored position (as shown in FIG. 2) and a deployed position (as shown in FIGS. 3-4). The cupholder panel 240 includes a bottom surface 242 that is facing upward in the Y-direction when in the stored position, and is facing the seat bottom when in the deployed position. The cupholder panel 240 may be biased to the deployed position, and released via pushing on a cupholder button 244. In other embodiments, the cupholder panel 240 may be deployed and stored in any suitable manner, including not being biased to the deployed position. The cupholder panel 240 may be hinged at the distal end 250 of the arm rest body 210 such that it flips up (in the Y-direction) and forward (in the X-direction) to the deployed position, as is shown in FIGS. 3-4.

Referring to FIGS. 3-4, the cupholder panel 240 is shown in the deployed position, revealing cupholder cavities 245 defined in the cupholder panel 240, on a side opposite to the bottom surface 242. Thus, the cupholder panel 240 extends forward in the X-direction from the distal end 250 of the arm rest body 210 when deployed. When the cupholder panel 240 is in the deployed position, as shown in FIGS. 3-4, the trash compartment 260 is revealed in the distal end 250. The trash compartment 260 includes a trash cavity 265 defined through at least a portion of the thickness of the arm rest body 210, with the movable member 220 defining the bottom of the trash cavity 265. The movable member 220 is supported within an opening defined in the A-side 215 of the armrest body 210. The movable member 220 may be releasably attached to the armrest body 210 in any suitable manner, such as, for example, via magnets.

The trash compartment 260 also includes a flexible member 222 defining the periphery of the trash cavity 265, as will be discussed in further detail below. The trash compartment 260 may include a frame (not shown in FIGS. 3-4) for supporting a top end of the flexible member 222 thereon, and which may include the connection feature (e.g., magnets) for releasably securing the movable member 220 thereon. The flexible member 222 may be any suitable material for allowing the flexible member 222 to form the trash cavity 265 therein such that the depth of the trash cavity 265 can be altered via manipulation of the flexible member 222. For example, the flexible member 222 may be a plastic bag (for example, a disposable bag that can be removed from the frame and trash compartment 260), or be a pre-installed fabric forming the trash box with sufficient flexibility and mechanism for expanding and contracting the flexible member 222 (e.g., a scissor wire mechanism within the material) to change the volume of the trash cavity 265 upon release of the movable member 220. In various embodiments, the movable member 220 can be released to allow for the trash cavity 265 to be expanded. In at least one embodiment, the movable member 220 is secured to the frame via a spring-forced scissor wire mechanism in the trash compartment 260, which allows the movable member 220 to snap out when the cupholder panel 240 is released. In other embodiments, the movable panel 220 may be moved via a spring-loaded side plate that can be manually released or via a push-button to move the movable member 220 to expand the trash cavity 265. As such, an occupant can manipulate the flexible member 222 based on the malleability of the flexible member 222, such that the depth of the trash cavity 265 can be increased when the trash compartment 260 is deployed.

When the trash compartment 260 is used, but not full, the movable member 220 can be manually or mechanistically returned to being flush with the A-surface 215 (e.g., the scissor wire). If trash within the trash cavity 265 obstructs the return of the movable member 220, the flexible member 222 must be emptied (for a pre-installed bag), or removed/replaced (for a disposable bag). When the trash cavity 265 is expanded, the movable member 220 may temporarily be stored in the storage compartment 230 until the armrest assembly is returned to the folded position (e.g., in embodiments where the bag is disposable), or may be fixed to the bottom of the flexible member 222 in embodiments where the flexible member 222 is pre-installed (e.g., not disposable).

In the embodiment shown in FIG. 3, the trash compartment 260 includes a cover 262. Although shown as a retractable cover 262 (having a closed position as shown in FIG. 3 and an open position in FIG. 4), the cover 262 may be any suitable cover with appropriate mechanisms for revealing the trash cavity 265, or may be omitted such that deploying the cupholder panel 240 reveals the trash cavity 265.

As shown in FIGS. 1-4, the trash cavity 265 has a varying volume as based on the expansion/movement of the flexible member 222 and the position of the movable member 220 in the Y-direction, which acts as a false floor for the trash cavity 265 when shown aligned with the A-surface 215 of the arm rest body 210, in embodiments where the flexible member 222 is a pre-installed bag with the movable member 220 fixed on the bottom. In some embodiments, the movable member 220 is attached to the arm rest body 210 by the flexible member 222, which defines the periphery of the trash cavity 265 of the trash compartment 260. In other embodiments (not shown), the movable member 220 may be independently connected to the arm rest body 210, with the flexible member 222 defining the trash cavity 265, with the movable member 220 releasably secured to the arm rest body 210. The flexible member 222 may be supported on a frame of the trash compartment 260, and in some embodiments, may be releasably secured to the frame. The flexible member 222 may be any suitable reusable and cleanable material that is fixed in the trash compartment 260 (e.g., polyethylene fabric that may be ultrasonically welded, stitched leather, textile, or imitation leather) or may be disposable, such as plastic bags that can be secured to the frame and movable member 220 and removed from the trash compartment 260 for disposal. Although the flexible member 222 is shown as a singular component, the flexible member 222 may include any suitable number of flexible portions to allow the flexible member 222 to open in the Y-direction to expand and contract the trash cavity 265. In the embodiments shown in FIGS. 3-4, the flexible member 222 is a different material from the movable panel 220, but in other embodiments, the materials may be the same or similar, such that the flexible member 222 can allow movement of the movable member 220 (e.g., the flexible member may be articulated or elastic to allow vertical movement of the movable member 220) in embodiments where the flexible member 222 is pre-installed. Thus, the trash compartment 260 with the movable member 220 can form a trash cavity 265 of greater volume when the flexible member 222 is extended to drop the movable panel 220 lower than the arm rest body 210 in the Y-direction, than compared to a trash cavity 265 when the movable panel 220 is flush with the A-surface 215. In at least one embodiment, the depth of the trash cavity 265 in the extended position is just above the A-side of the seat surface to avoid soiling or damage to the seat. For example, in some embodiments, the movable member 220 may hover 5 to 20 mm from the A-surface of the seat bottom, in other embodiments 5 to 15 mm from the A-surface, and in yet further embodiments, 5 to 10 mm from the A-surface.

Figure 5:
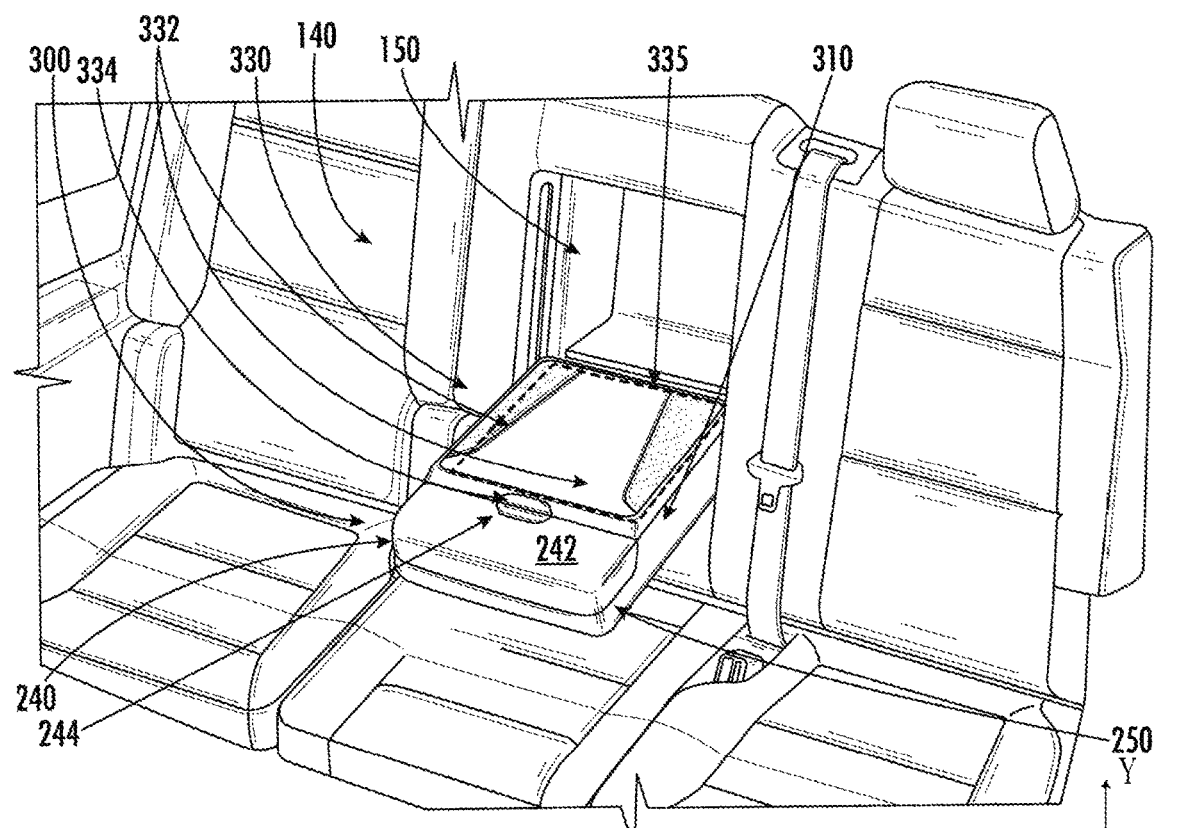
FIG. 5 is a perspective view of an arm rest assembly, according to another embodiment.

Referring to FIG. 5, an arm rest assembly 300 is shown according to another embodiment. As previously noted, like numerals will be used to reflect like components of the arm rest assembly 300 of the shown embodiment. The arm rest assembly 300 includes an arm rest body 310 shown in the use position, as comparable with FIG. 2.

Figure 6:
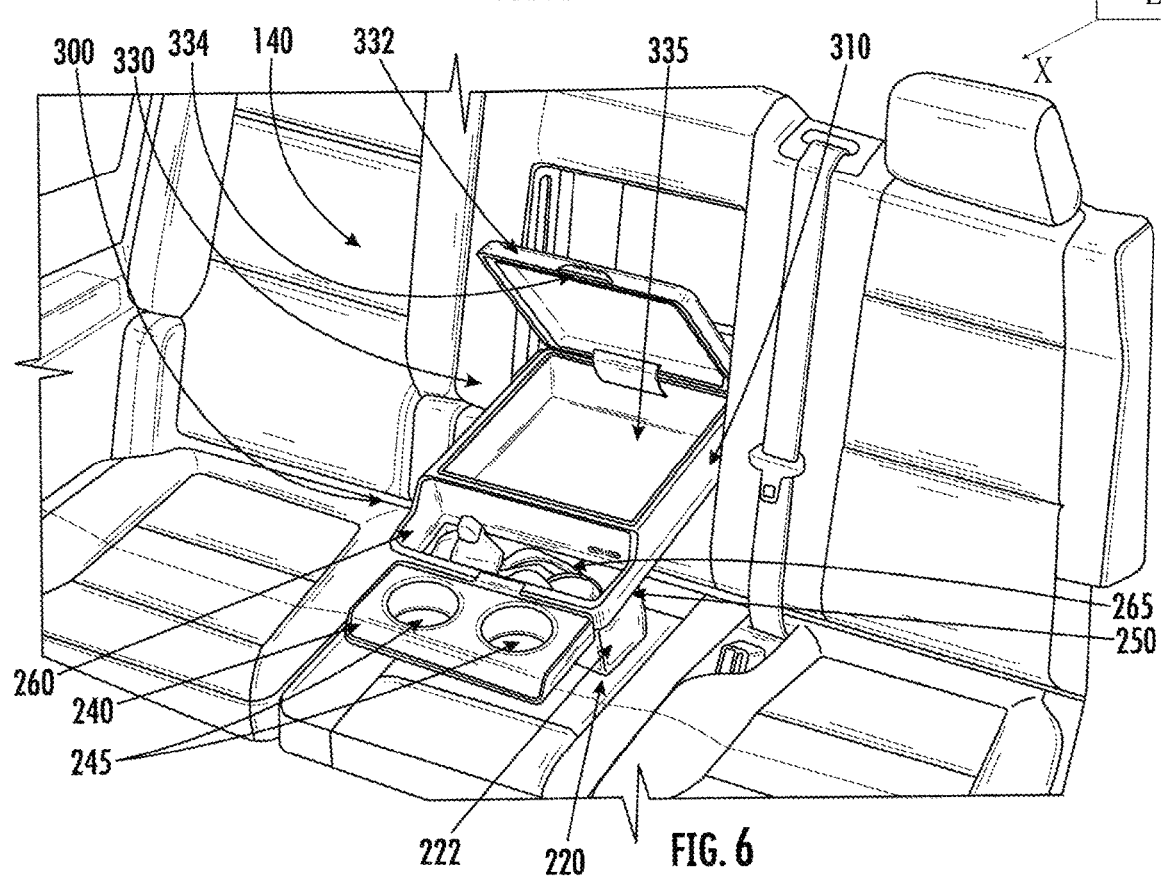
FIG. 6 is a schematic illustration of features of the arm rest assembly of FIG. 5.

The arm rest assembly 300 includes a storage compartment 330 with a storage compartment cavity 335 defined within the arm rest body 310, with a storage compartment door 332 concealing the storage compartment cavity 335. In the embodiment of FIG. 5, the storage compartment 330 is shown closed with the storage compartment door 332 concealing the storage compartment cavity 335. The storage compartment door 332 is shown as a single door in the embodiment of FIG. 5, with the storage compartment door 332 being hinged on an end of the arm rest body 310, opposite to the distal end 250 such that the storage compartment door 332 opens upward (in the Y-direction) and pivots toward the seatback 120 based on the hinge. The storage compartment door 332 may include any suitable feature for opening the storage compartment door 332. For example, as shown in the embodiment of FIG. 5, the storage compartment door 332 may be biased to an open position (revealing the storage compartment cavity 335), and released via pushing on the release button 334. However, in other embodiments, not shown, the storage compartment door 332 may be opened and closed in any suitable manner, and may not be biased to being open. In FIG. 6, the storage compartment 330 is shown with the storage compartment door 332 in an open position, revealing the storage compartment cavity 335.

Referring again to FIGS. 5-6, the arm rest assembly 300 includes a similar cupholder panel 240 as the cupholder panel shown in FIGS. 2-4, and a trash compartment 260, as shown in FIGS. 2-4. The cupholder panel 240 is on the inner side of the arm rest body 310, opposite to the A-surface 215. The cupholder panel 240 has a stored position (as shown in FIG. 5) and a deployed position (as shown in FIG. 6). The cupholder panel 240 includes a bottom surface 242 that is facing upward in the Y-direction when in the stored position, and is facing the seat bottom when in the deployed position. The cupholder panel 240 may be biased to the deployed position, and released via pushing on a cupholder button 244. In other embodiments, the cupholder panel 240 may be deployed and stored in any suitable manner, including not being biased to the deployed position. The cupholder panel 240 may be hinged at the distal end 250 of the arm rest body 210 such that it flips up (in the Y-direction) and forward (in the X-direction) to the deployed position, as is shown in FIG. 6.

Referring to FIG. 6, the cupholder panel 240 is shown in the deployed position, revealing cupholder cavities 245 defined in the cupholder panel 240, on a side opposite to the bottom surface 242. Thus, the cupholder panel 240 extends forward in the X-direction from the distal end 250 of the arm rest body 310 when deployed. When the cupholder panel 240 is in the deployed position, as shown in FIG. 6, the trash compartment 260 is revealed in the distal end 250. The trash compartment 260 includes a trash cavity 265 defined through at least a portion of the thickness of the arm rest body 310, with the movable member 220 defining the bottom of the trash cavity 265 (in embodiments where the movable member 220 is on a preinstalled bag), or may be temporarily removed (in embodiments where the bag is disposable). The trash compartment 260 also includes a flexible member 222 defining the periphery of the trash cavity 265, as will be discussed in further detail below with respect to particular embodiments. Although not shown in FIGS. 5-6, the trash compartment 260 may include a cover (not shown) as previously discussed with respect to FIG. 3.

Similar to the embodiment of FIGS. 2-4, the embodiment of FIGS. 5-6 includes the trash cavity 265 with a varying volume as based on the position of the movable member 220 in the Y-direction, which acts as a false floor for the trash cavity 265 when shown aligned with the A-surface 215 of the arm rest body 310. The movable member 220 may be releasably attached to the arm rest body 310 at a frame (in embodiments where the flexible member 222 may be disposable), or may be attached to a bottom of the flexible member 222 (in embodiments where the flexible member 222 is pre-installed), which defines the periphery of the trash cavity 265 of the trash compartment 260 and allows the flexible member 222 to extend in the Y-direction to expand and contract the trash cavity 265. In other embodiments, for example, where the flexible member 222 is disposable, the movable member 220 may be independently attached to the arm rest body 310, such that the flexible member 222 forms the trash cavity 265 without connection to or corresponding movement with the movable member 220.

Figure 7:
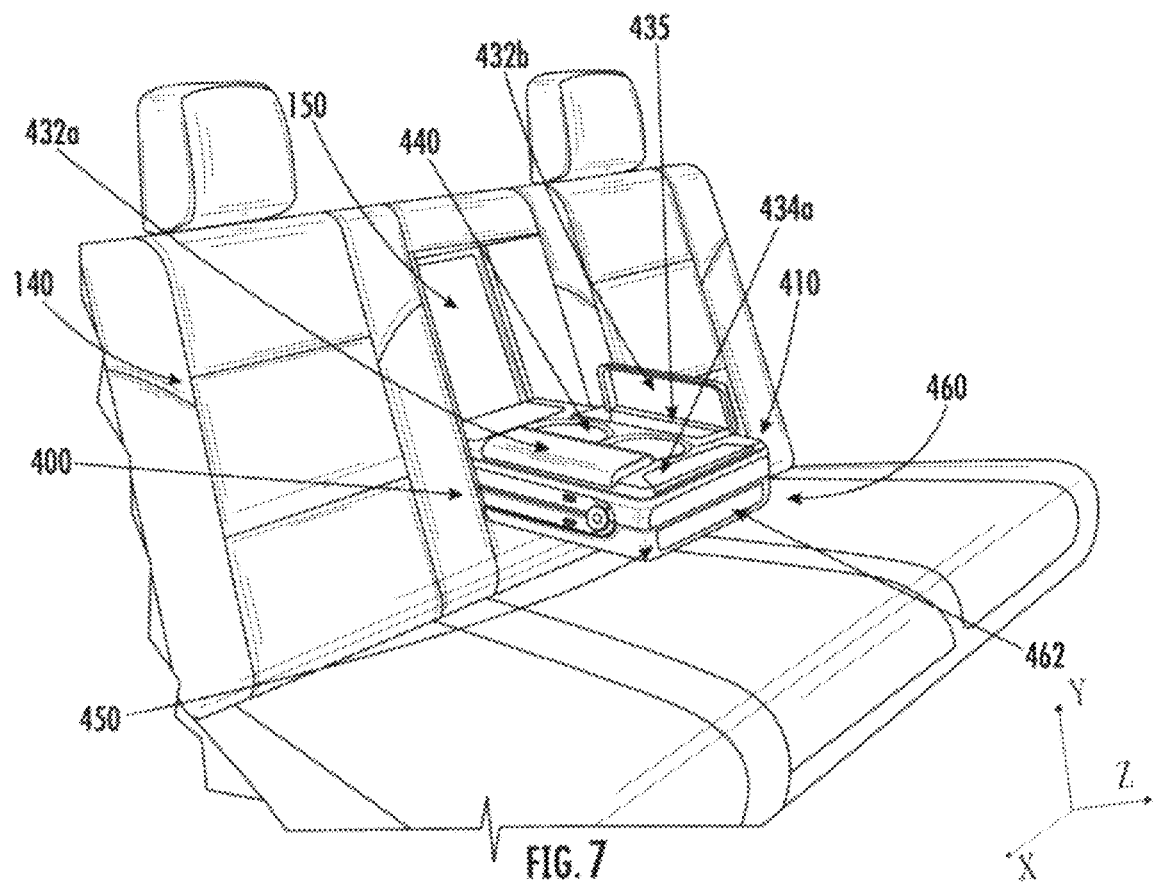
FIG. 7 is a perspective view of an arm rest assembly, according to another embodiment.
Figure 8:
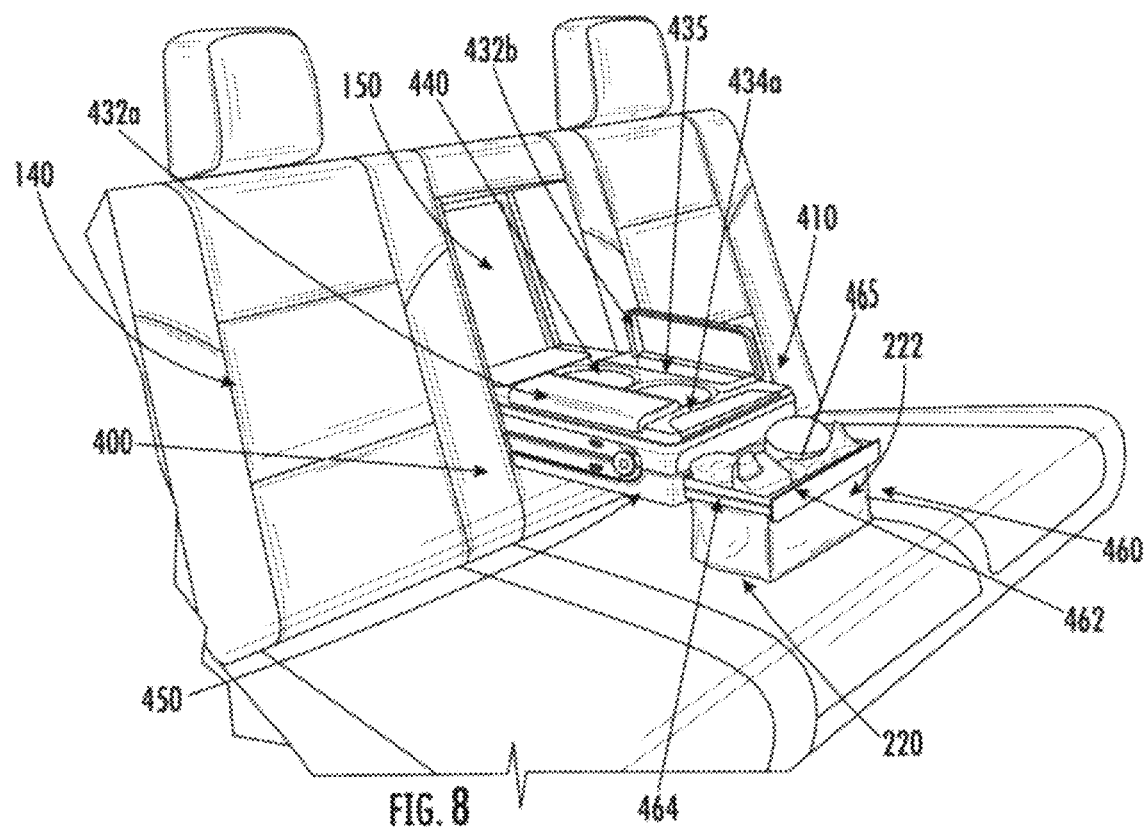
FIG. 8 is a schematic illustration of features of the arm rest assembly of FIG. 7.

Referring to FIGS. 7-8, an arm rest assembly 400 is shown according to another embodiment. As previously noted, like numerals will be used to reflect like components of the arm rest assembly 400 of the shown embodiment. The arm rest assembly 400 includes an arm rest body 410 shown in the use position, as comparable with FIG. 2. The arm rest assembly 400 includes a storage compartment defining a storage compartment cavity 435 defined in the arm rest body 410, with storage compartment doors 432a, 432b concealing the storage compartment cavity 435. In the embodiment of FIG. 7-8, the storage compartment 230 is shown with one of the storage compartment doors 432a of the storage compartment doors 432a, 432b revealing a portion of the storage compartment cavity 435, while the other door 432b remains closed concealing another portion of the storage compartment cavity 235. The storage compartment doors 432a, 432b may include any suitable features for opening the storage compartment doors 432a, 432b. For example, as shown in the embodiment of FIGS. 7-8, the storage compartment doors 432a, 432b may be biased in an open position (for revealing the storage compartment cavity 435), and released via pushing on button(s) 434a, respectively. In the embodiment shown in FIGS. 7-8, the storage compartment includes a cupholder panel 440 disposed in the storage compartment cavity 435. The cupholder panel 440 may be clipped onto the storage compartment cavity 435 using plastic hooks, and may be removable in certain embodiments to expose the storage compartment cavity 435. Although a cupholder panel 440 is shown, the storage compartment cavity 435 may include any suitable features within the arm rest body 410 as based on occupant comfort and convenience. Furthermore, the storage compartment doors 432a, 432b may allow the cupholder panel 440 to be used when the storage compartment doors 432a, 432b are closed, such that they are sized only to cover corresponding storage compartment cavities (storage compartment cavity 435 is shown).

Referring to FIGS. 7-8, the arm rest assembly 400 includes a trash compartment 460 storable in a distal end 450 of the arm rest body 410 in a compartment storage cavity in the arm rest body 410. The trash compartment 460 includes a handle 462 at the distal end 450 when the trash compartment 460 is in a stored position (as in FIG. 7). The trash compartment 460 is pulled out of the arm rest body 410 via the handle 462 in the X-direction of the vehicle (i.e., away from the seatback 120) to a deployed position (as in FIG. 8), to reveal the trash cavity 465 defined by an inner periphery of a trash compartment frame 464. In certain embodiments, the trash compartment 460 is slidably connected to the arm rest body 410 such that the trash compartment 460 translates between the stored position and the deployed position. The trash compartment 460 includes the movable member 220, which may, in some embodiments, define the bottom of the trash cavity 465, and a flexible member 222 defining the periphery of the trash cavity 465, and supported by the trash compartment frame 464. In other embodiments, the movable member 220 may be releasably secured such that it can be stored during use of the trash compartment 460, for example, in embodiments where the flexible member 222 is disposable. The trash cavity 465 has a varying volume as based on the extension of the flexible member 222 in the Y-direction, where the movable member 220, whether attached to the flexible member 222 or releasably secured to the arm rest body 210, acts as a false floor for the trash cavity 465 when shown aligned with the A-surface 215 of the arm rest body 210.

In embodiments with a disposable bag, the movable member 220 may be removed from the A-surface, and temporarily stored in the storage compartment 230 while the trash compartment 460 is being used. The movable member 220 may be releasably attached to the trash compartment frame 464 via the flexible member 222, which defines the periphery of the trash cavity 265 of the trash compartment 260, or may be secured to the bottom of the flexible member 222 for embodiments where the flexible member 222 is a pre-installed bag. Thus, the trash compartment 460 with the movable member 220 can form a trash cavity 465 of greater volume when the flexible member 222 is extended to drop the movable panel 220 lower than the arm rest body 410 in the Y-direction. In some embodiments, in the stored position, the movable member 220 and the flexible member 222 are stored in an opening formed by the inner periphery of the frame 464 such that the trash compartment 460 can be housed in the compartment storage cavity.

Figure 9:
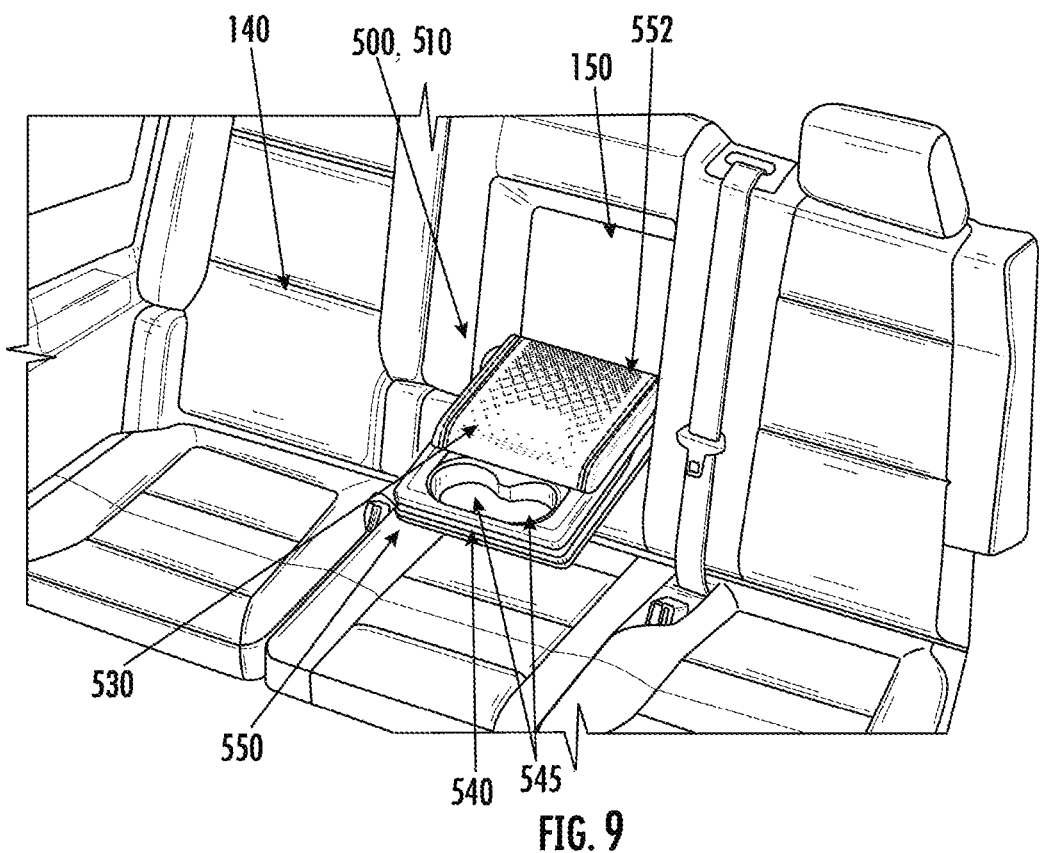
FIG. 9 is a perspective view of an arm rest assembly, according to another embodiment.
Figure 10:
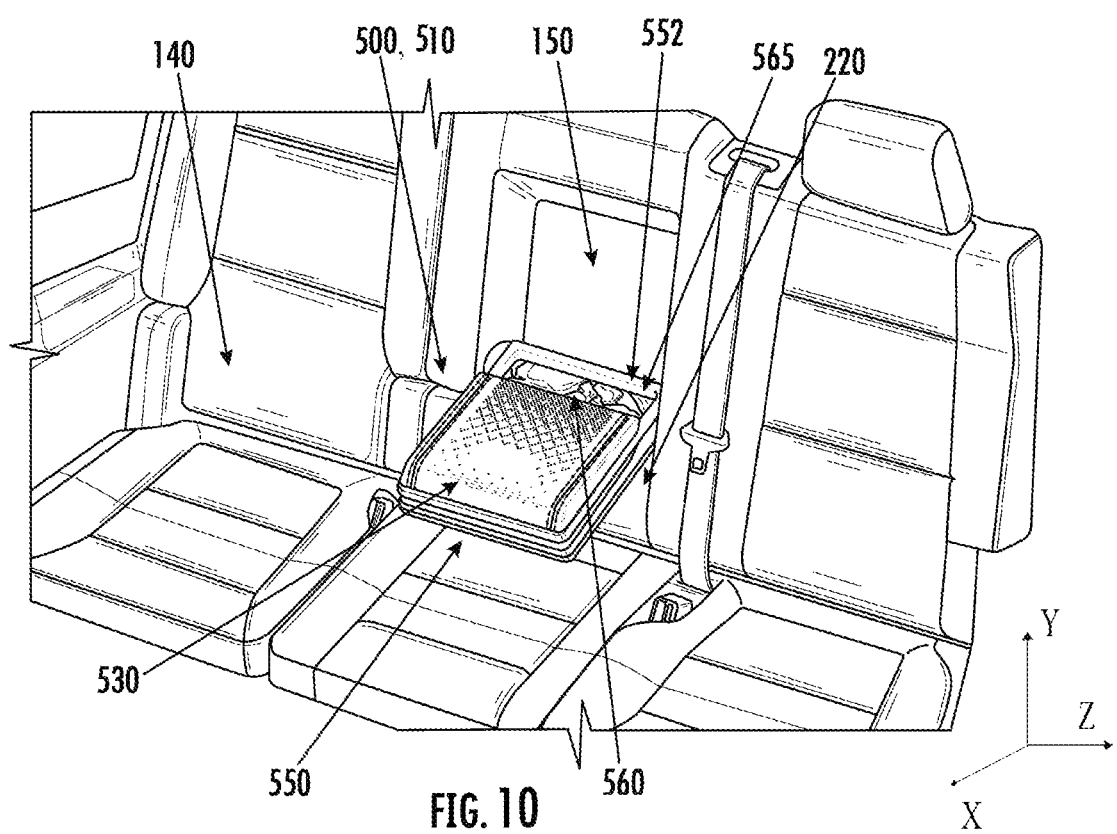
FIG. 10 is a schematic illustration of features of the arm rest assembly of FIG. 9.

Referring to FIGS. 9-10, an arm rest assembly 500 is shown according to another embodiment. As previously noted, like numerals will be used to reflect like components of the arm rest assembly 500 of the shown embodiment. The arm rest assembly 500 includes an arm rest body 510 shown in the use position, as comparable with FIG. 2.

The arm rest assembly 500 includes a cupholder panel 540 at a distal end 550 of the arm rest body 510, the cupholder panel including cupholder cavities 545. The arm rest assembly 500 also includes a sliding door 530 that is movable in the X-direction, toward the distal end 550 to conceal the cupholder panel 540 when in a forward position (FIG. 10) and toward the rear end 552 of the arm rest body 510, opposite to the distal end 550, when in a rearward position, revealing the cupholder panel 540 (FIG. 9). When in the forward position, as shown in FIG. 10, the sliding door 530 reveals a trash compartment 560 in the arm rest assembly 500. The trash compartment 560 includes a trash cavity 565 defined through at least a portion of the thickness of the arm rest body 510, with the movable member 220 being releasably secured or fixed, per the embodiments previously discussed. The trash compartment 560 also includes a flexible member 222 defining the periphery of the trash cavity 565, as will be discussed in further detail below. In the embodiment shown in FIG. 10, the trash compartment 560 may be located toward the rear end 552 of the arm rest body 510, as opposed to toward the distal end 250 as shown in the embodiment of FIG. 1. The movable member 220 may similarly be flush with the A-surface 215 as previously discussed.

Referring again to FIG. 10, the trash cavity 565 has a varying volume as based on the extension of the flexible member 222 in the Y-direction, with the movable member 220 acting as a false floor for the trash cavity 565 when shown aligned with the A-surface 215 of the arm rest body 510. The movable member 220 may be attached to the arm rest body 510 by the flexible member 222 (in embodiments where the bag is pre-installed), which defines the periphery of the trash cavity 565 of the trash compartment 560, or may be releasably secured to the arm rest body 510 for temporary storage during deployment of the flexible member 222. Thus, the trash compartment 560 with the movable member 220 can form a trash cavity 565 of greater volume when the flexible member 222 is extended lower than the arm rest body 510 in the Y-direction, than compared to a trash cavity 565 when the movable panel 220 is flush with the A-surface 215.

Figure 11:
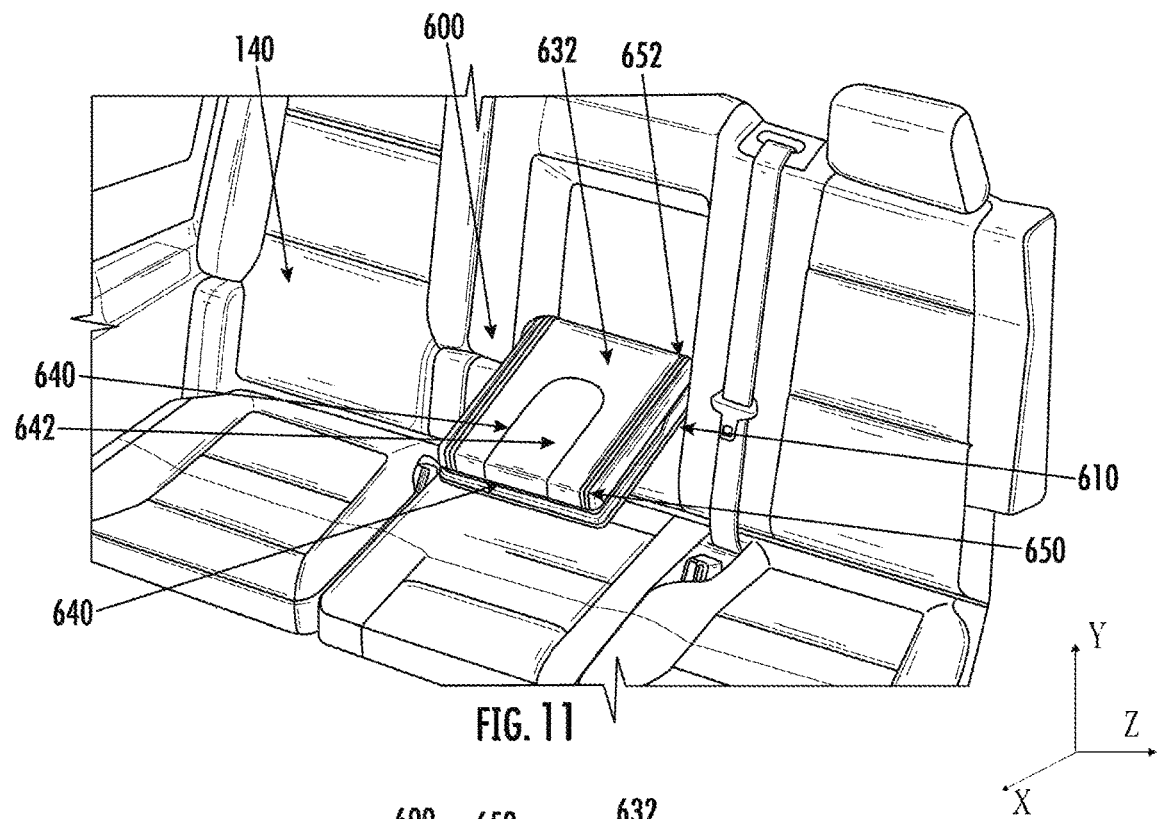
FIG. 11 is a perspective view of an arm rest assembly, according to another embodiment.
Figure 12:
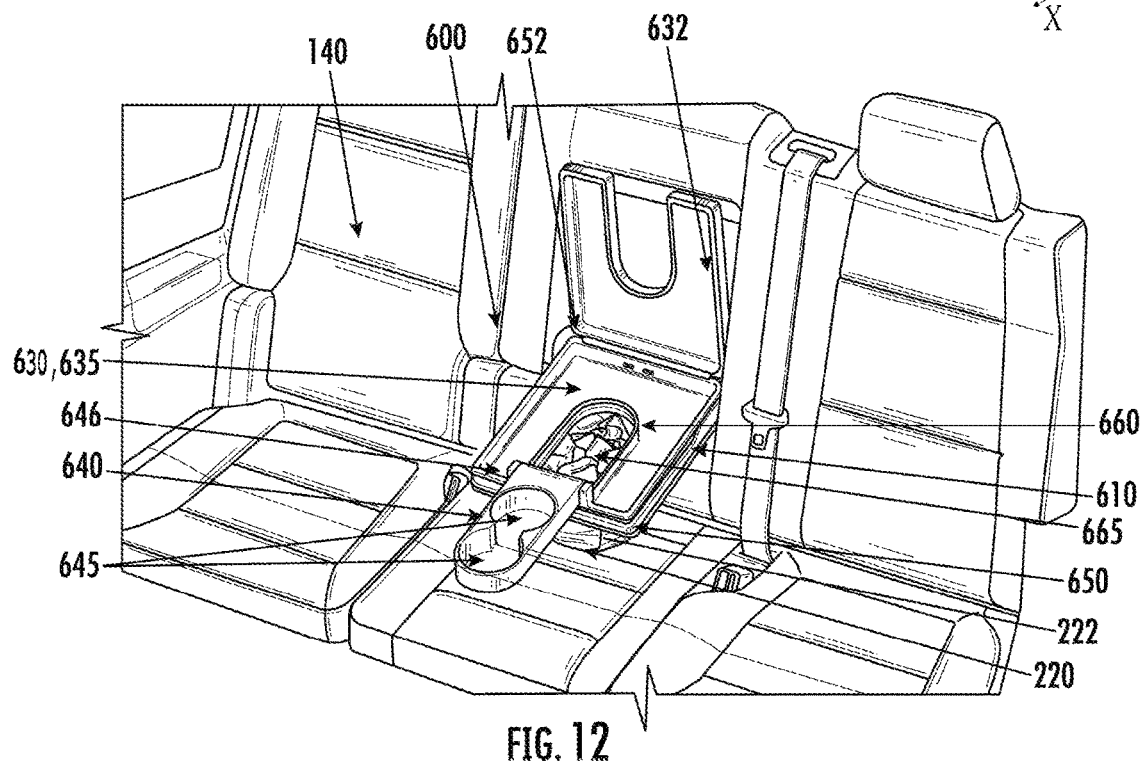
FIGS. 12-13 are schematic illustrations of features of the arm rest assembly of FIG. 11.
Figure 13:
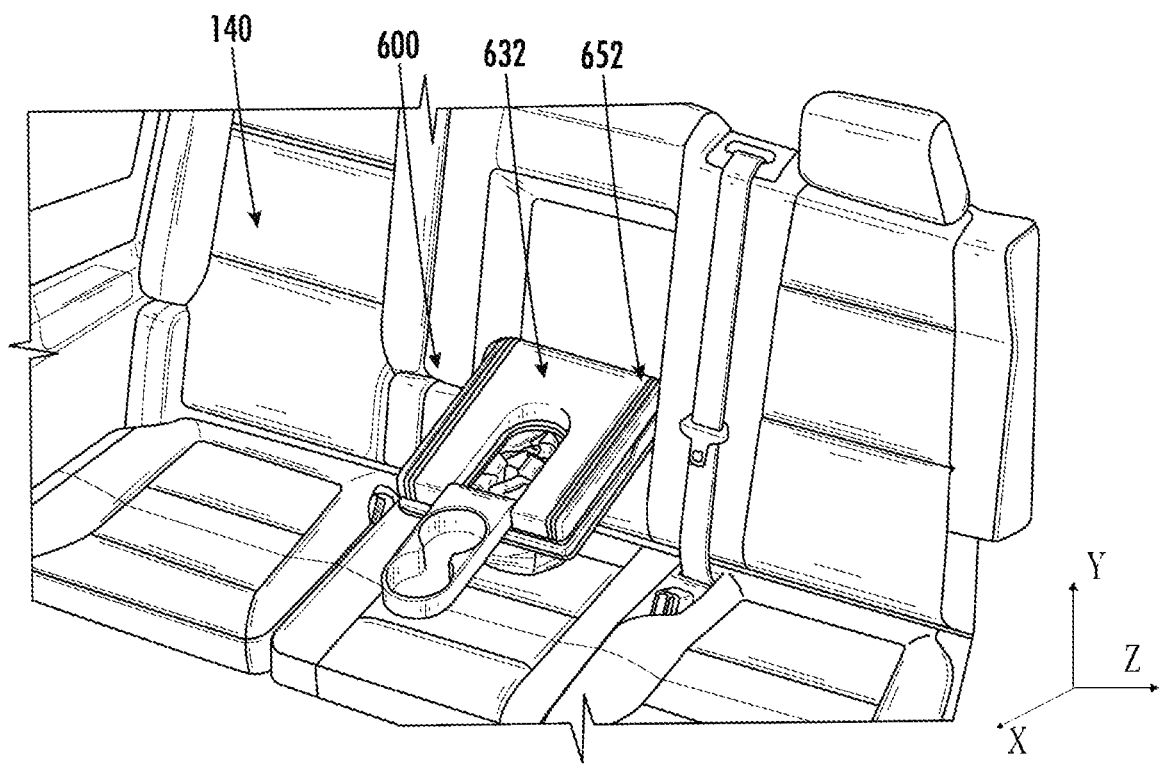

Referring to FIGS. 11-13, an arm rest assembly 600 is shown according to another embodiment. As previously noted, like numerals will be used to reflect like components of the arm rest assembly 600 of the shown embodiment. The arm rest assembly 600 includes an arm rest body 610 shown in the use position, as comparable with FIG. 2.

The arm rest assembly 600 includes a storage compartment 630 with a storage compartment cavity 635 defined within the arm rest body 610, with a storage compartment door 632 concealing the storage compartment cavity 635. In the embodiment of FIG. 11, the storage compartment 630 is shown closed with the storage compartment door 632 concealing the storage compartment cavity 635. The storage compartment door 632 is shown as a single door in the embodiment of FIGS. 11-13, with the storage compartment door 632 being hinged on an end 652 of the arm rest body 610, opposite to the distal end 650 such that the storage compartment door 632 opens upward (in the Y-direction) and pivots toward the seatback 120 based on the hinge at the end 652, as shown in FIG. 12. The storage compartment door 632 may include any suitable feature for opening the storage compartment door 632 (e.g., buttons for releasing a biased storage compartment door 632, or manual movement). In FIG. 12, the storage compartment 630 is shown with the storage compartment door 632 in an open position, revealing the storage compartment cavity 635.

The arm rest assembly 600 also includes a cupholder panel 640 extending toward a distal end 650 of the arm rest body 610. The embodiment of FIGS. 11-13 includes the cupholders of the cupholder panel 640 in an aligned arrangement in the X-direction, as opposed to the Z-direction of the embodiments shown in FIGS. 2-6. The cupholder panel 640 is on the inner side of the arm rest body 610, opposite to the A-surface 215. The cupholder panel 640 has a stored position (as shown in FIG. 11) and a deployed position (as shown in FIGS. 12-13). As will be discussed in further detail below, the trash compartment 630 is based on the shape of the cupholder panel 640, and the movable member 220 may similarly be shaped.

The cupholder panel 640 includes a bottom surface 642 that is facing upward in the Y-direction when in the stored position, and is facing the seat bottom when in the deployed position. The cupholder panel 640 may be biased to the deployed position, and released via pushing on a cupholder release button (not shown) or via lifting the storage compartment door 632, or be manually movable about a hinge 646 to pivot the cupholder panel 640 from the stored position to the deployed position. In other embodiments, the cupholder panel 640 may be deployed and stored in any suitable manner, including where the cupholder panel 640 may not be biased to the deployed position. The cupholder panel 640 may be hinged at the distal end 650 of the arm rest body 610 such that it flips up (in the Y-direction) and forward (in the X-direction) to the deployed position, as is shown in FIGS. 12-13.

Upon deployment to the deployed position, the cupholder panel 640 reveals cupholder cavities 645 on a side of the cupholder panel 640 opposite to the bottom surface 642. Upon movement to the deployed position, where the cupholder panel 640 extends forward in the X-direction from the distal end 650 of the arm rest body 610, a trash compartment 660 is revealed in the arm rest assembly 600. With reference to FIG. 13, the storage compartment door 630 may be closed to conceal the storage compartment cavity 635 while the cupholder panel 640 is in the deployed position, thus still exposing the trash compartment 660 while the storage compartment door 630 is closed.

Referring again to FIGS. 12-13, the trash compartment 660 includes a trash cavity 665 defined through at least a portion of the thickness of the arm rest body 610, with the movable member 220 (in embodiments where the movable member 220 is on a preinstalled bag), or may be temporarily removed (in embodiments where the bag is disposable). The trash compartment 660 also includes a flexible member 222 defining the periphery of the trash cavity 665, as will be discussed in further detail below. In the embodiment shown in FIGS. 12-13, the trash compartment 560 may be located toward the distal end 650 of the arm rest body 610. The movable member 220 may similarly be flush with the A-surface 215 as previously discussed, when the trash compartment 660 is not in use.

Referring again to FIGS. 12-13, the trash cavity 665 has a varying volume as based on the extension of the flexible member 222 in the Y-direction, with the movable member 220 acting as a false floor for the trash cavity 665 when shown aligned with the A-surface 215 of the arm rest body 610. The movable member 220 is releasably attached to the arm rest body 610, either by the flexible member 222 (in embodiments where the flexible member 222 is a preinstalled bag), or temporarily removable (in embodiments where the flexible member 222 is a disposable bag) to allow movement of the movable member 220. Thus, the trash compartment 660 with the movable member 220 can form a trash cavity 665 of greater volume when the flexible member 222 is extended to drop lower than the arm rest body 610 in the Y-direction, than compared to a trash cavity 665 when the movable panel 220 is flush with the A-surface 215.

According to embodiments of the present disclosure, an arm rest assembly with a trash compartment is provided. The arm rest assembly includes an arm rest body defining a trash cavity there through. The trash compartment has a stored position and an extended position, with a movable member releasably positioned between the stored and extended positions. In the stored position, the movable member may be flush with the A-surface of the arm rest body, or be stored within the arm rest body. In the extended position, the movable member drops below the arm rest body to increase the volume of the trash cavity, via a flexible member connecting the movable member to the arm rest body, or may be removed such that the flexible member extends to form the trash cavity. The trash compartment may be revealed via movement of a cupholder panel, movement of a storage compartment door, or via a handle when stored in the arm rest body. As such, the trash compartment can be hidden and also provide larger volume when being used by an occupant.

As with reference to the Figures, the same reference numerals may be used herein to refer to the same parameters and components or their similar modifications and alternatives. For purposes of description herein, the directional terms "upper," "lower," "right," "left," "rear," "front," "forward," "rearward," "vertical," "horizontal," and derivatives thereof shall relate to the present disclosure as oriented in FIG. 1. However, it is to be understood that the present disclosure may assume various alternative orientations, except where expressly specified to the contrary. It is also to be understood that the specific devices and processes illustrated in the drawings and described in the following specification are simply exemplary embodiments of the inventive concepts defined in the appended claims. Hence, specific dimensions and other physical characteristics relating to the embodiments disclosed herein are not to be considered as limiting, unless the claims expressly state otherwise. The drawings referenced herein are schematic and associated views thereof are not necessarily drawn to scale.

While exemplary embodiments are described above, it is not intended that these embodiments describe all possible forms of the invention. Rather, the words used in the specification are words of description rather than limitation, and it is understood that various changes may be made without departing from the spirit and scope of the invention. Additionally, the features of various implementing embodiments may be combined to form further embodiments of the invention.

What is claimed is:

1. An arm rest assembly, comprising:
   an arm rest body comprising an A-surface with an opening defined therethrough; and
   a trash compartment including a movable member releasably secured within the opening at the A-surface, and a flexible member configured to form a trash cavity, wherein the trash compartment is configured to move between a stored position and an extended position, wherein the movable member is secured to a bottom of the flexible member such that, in the stored position, the movable member is flush with the A-surface, and in the extended position, at least a portion of the flexible member and the movable member are positioned below the A-surface such that a trash cavity volume in the extended position is greater than a trash cavity volume in the stored position.

2. The arm rest assembly of claim 1, further comprising a cupholder panel secured to the arm rest body at a distal end, the cupholder panel comprising a storage position and a deployed position, wherein in the deployed position, the cupholder panel reveals the trash cavity.

3. The arm rest assembly of claim 2, wherein the cupholder panel is hingedly connected to the arm rest body at the distal end such that the cupholder panel pivots about a hinge from the storage position to the deployed position.

4. The arm rest assembly of claim 1, further comprising a storage compartment with a storage cavity defined in the arm rest body.

5. The arm rest assembly of claim 4, wherein the storage cavity is concealed and revealed via at least one storage compartment door.

6. The arm rest assembly of claim 1, further comprising a sliding door slidably attached to an inner surface of the arm rest body, opposite to the A-surface.

7. The arm rest assembly of claim 6, wherein the sliding door has a forward position revealing the trash compartment at an inner end of the arm rest body, and concealing a cupholder panel.

8. The arm rest assembly of claim 7, wherein the sliding door has a rearward position revealing the cupholder panel at a distal end of the arm rest body opposite to the inner end, and concealing the trash compartment.

9. The arm rest assembly of claim 1, wherein the movable member defines a bottom of the trash cavity, and wherein the flexible member defines a periphery of the trash cavity.

10. An arm rest assembly, comprising:
    an arm rest body comprising an A-surface with an opening defined therethrough; and
    a trash compartment including a movable member releasably secured within the opening at the A-surface, and a flexible member configured to form a trash cavity, wherein the trash compartment is configured to move between a stored position and an extended position, wherein the movable member is secured to a bottom of the flexible member such that, in the stored position, the movable member is flush with the A-surface, and in the extended position, at least a portion of the flexible member and the movable member are positioned below the A-surface to increase a volume of the trash cavity; and
    a cupholder panel attached to the arm rest body, wherein the cupholder panel comprises a storage position concealing the trash compartment, and a deployed position revealing the trash compartment.

11. The arm rest assembly of claim 10, wherein the cupholder panel is attached at a distal end of the arm rest body and is hingedly connected to the arm rest body such that the cupholder panel pivots about a hinge from the storage position to the deployed position.

12. The arm rest assembly of claim 11, wherein the cupholder panel is movable from the storage position to the deployed position upon opening of a storage compartment door attached to the arm rest body.

13. The arm rest assembly of claim 12, wherein the storage compartment door is closed while the cupholder panel is in the deployed position.

14. The arm rest assembly of claim 10, further comprising a storage compartment with a storage cavity defined in the arm rest body, wherein the storage cavity is concealed and revealed via at least one storage compartment door.

15. The arm rest assembly of claim 10, wherein the trash compartment includes a cover to selectively conceal the trash cavity.

16. The arm rest assembly of claim 10, wherein the movable member defines a bottom of the trash cavity, and wherein the flexible member defines a periphery of the trash cavity.

17. An arm rest assembly, comprising:
    an arm rest body with an A-surface, wherein the arm rest body comprises a trash compartment storage cavity defined therein; and
    a trash compartment housed in the trash compartment storage cavity in a compartment storage position, and extending from a distal end of the arm rest body in a deployed position, the trash compartment including a frame, a movable member releasably secured with the arm rest body, and a flexible member connected to the frame, the flexible member defining a trash cavity, wherein the trash compartment is configured to move between a stored position and an extended position, wherein the movable member is secured to a bottom of the flexible member such that, in the stored position, the movable member is stored flush with the A-surface, and in the extended position, at least a portion of the flexible member and the moveable member are positioned lower than the arm rest body.

18. The arm rest assembly of claim 17, wherein the movable member is releasably secured to the arm rest body via corresponding magnets on the movable member and the arm rest body.

19. The arm rest assembly of claim 17, wherein the movable member is secured to a bottom of the flexible member such that the movable member moves upon extension of the flexible member to the extended position.

20. The arm rest assembly of claim 17, wherein the trash compartment is slidably connected to the arm rest body such that the frame translates between the compartment storage position and the deployed position.

* * * * *